United States Patent
Crabtree et al.

(10) Patent No.: US 9,028,594 B2
(45) Date of Patent: *May 12, 2015

(54) SELF SERVICE KIOSK INCORPORATING MOISTURE REPELLANT FILTER

(75) Inventors: LaMonte A. Crabtree, LaGrange, KY (US); Mike Raider, Louisville, KY (US)

(73) Assignee: Clarcor Air Filtration Production, Inc., Jeffersonville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/185,830

(22) Filed: Jul. 19, 2011

(65) Prior Publication Data

US 2012/0048115 A1 Mar. 1, 2012

Related U.S. Application Data

(60) Provisional application No. 61/366,674, filed on Jul. 22, 2010.

(51) Int. Cl.
*B01D 46/00* (2006.01)
*G07F 9/10* (2006.01)
*G07F 19/00* (2006.01)

(52) U.S. Cl.
CPC ............... *G07F 9/10* (2013.01); *G07F 19/201* (2013.01); *G07F 19/205* (2013.01); *B01D 46/0023* (2013.01); *B01D 2279/45* (2013.01)

(58) Field of Classification Search
USPC .................. 55/385.1, 385.2, 385.6, 473, 356, 55/DIG. 18, 481, 485, 486, 385.4, 524, 55/527; 96/59, 66, 70, 72, 79, 95, 98; 454/184, 187, 230, 306, 338; 273/287, 273/309; 194/350; 95/63, 70, 79; 361/695
See application file for complete search history.

(56) References Cited

U.S. PATENT DOCUMENTS

| | | | |
|---|---|---|---|
| 3,987,258 A | 10/1976 | Tsutsui et al. | |
| 4,833,026 A | 5/1989 | Kausch | |
| 4,877,433 A | 10/1989 | Oshitari | |
| 4,902,423 A | 2/1990 | Bacino | |
| 4,949,218 A | 8/1990 | Blanchard et al. | |
| 5,290,447 A | 3/1994 | Lippold | |
| 5,395,411 A | 3/1995 | Kobayashi | |

(Continued)

FOREIGN PATENT DOCUMENTS

| | | |
|---|---|---|
| DE | 19755466 A1 | 6/1999 |
| EP | 0407566 A1 | 1/1991 |

(Continued)

OTHER PUBLICATIONS

IBM, Ventilation System for Data Processing Systems, Technical Disclosure Bulletin, Feb. 1975, 2 pages.

(Continued)

*Primary Examiner* — Duane Smith
*Assistant Examiner* — Minh-Chau Pham
(74) *Attorney, Agent, or Firm* — Reinhart Boerner Van Deuren P.C.

(57) ABSTRACT

A self service kiosk station employing a water repellant air filter is provided. The self service kiosk may take many forms including a vending machine, gaming station, ATM, DVD rental machine, or the like. Positive pressure within the housing may be employed as well to keep contaminants outs and ensure air flow into the housing is through the water repellant air filter.

19 Claims, 7 Drawing Sheets

(56) References Cited

U.S. PATENT DOCUMENTS

| | | | |
|---|---|---|---|
| 5,409,419 A | 4/1995 | Euchner et al. | |
| 5,462,586 A | 10/1995 | Sugiyama et al. | |
| 5,507,847 A | 4/1996 | George et al. | |
| 5,573,562 A | 11/1996 | Schauwecker et al. | |
| 5,646,823 A | 7/1997 | Amori | |
| 5,650,451 A | 7/1997 | Yagi et al. | |
| 5,804,014 A | 9/1998 | Kähler | |
| 5,814,405 A | 9/1998 | Branca et al. | |
| 5,886,296 A | 3/1999 | Ghorbani et al. | |
| 5,901,034 A | 5/1999 | Füglister | |
| 5,942,017 A * | 8/1999 | Van Winkle, Sr. | 55/385.1 |
| 6,039,776 A * | 3/2000 | Liue et al. | 55/385.1 |
| 6,123,076 A | 9/2000 | Roberts et al. | |
| 6,218,000 B1 | 4/2001 | Rudolf et al. | |
| 6,419,871 B1 | 7/2002 | Ogale | |
| 6,568,540 B1 | 5/2003 | Holzmann et al. | |
| 6,685,833 B2 | 2/2004 | Lippold | |
| 6,780,217 B1 | 8/2004 | Palmer | |
| 6,885,554 B1 * | 4/2005 | Reeck et al. | 361/695 |
| 7,070,641 B1 | 7/2006 | Gunderson et al. | |
| 7,186,285 B2 * | 3/2007 | Nakano et al. | 55/385.1 |
| 7,455,706 B2 * | 11/2008 | Latham et al. | 55/385.1 |
| 7,459,002 B2 * | 12/2008 | Kalous et al. | 55/385.1 |
| 8,252,097 B2 * | 8/2012 | Wiser | 96/59 |
| 8,535,404 B2 * | 9/2013 | Crabtree et al. | 55/385.6 |
| 8,668,755 B2 * | 3/2014 | Crabtree et al. | 55/385.6 |
| 2002/0194793 A1 | 12/2002 | Bowron | |
| 2004/0112023 A1 | 6/2004 | Choi | |
| 2005/0108996 A1 | 5/2005 | Latham et al. | |
| 2006/0277877 A1 * | 12/2006 | Shields | 55/486 |
| 2007/0175192 A1 | 8/2007 | Niakan et al. | |
| 2008/0022645 A1 * | 1/2008 | Skirius et al. | 55/524 |
| 2009/0139405 A1 | 6/2009 | Schwarz et al. | |
| 2009/0199717 A1 | 8/2009 | Green et al. | |
| 2009/0266759 A1 | 10/2009 | Green | |
| 2010/0181249 A1 | 7/2010 | Green et al. | |
| 2010/0313757 A1 * | 12/2010 | Crabtree et al. | 95/273 |
| 2010/0313760 A1 | 12/2010 | Crabtree et al. | |
| 2011/0120067 A1 * | 5/2011 | Kim | 55/385.1 |
| 2012/0031063 A1 * | 2/2012 | Soyama et al. | 55/527 |

FOREIGN PATENT DOCUMENTS

| | | |
|---|---|---|
| EP | 0395331 A1 | 10/1991 |
| EP | 1040738 A1 | 10/2000 |
| EP | 1266681 A2 | 12/2002 |
| EP | 1 098 692 B1 | 5/2003 |
| EP | 1674144 A1 | 6/2006 |
| EP | 1 750 493 A1 | 2/2007 |
| JP | Hei2(1990)-17852 | 2/1990 |
| JP | 04-338794 | 11/1992 |
| JP | 06-031130 | 2/1994 |
| JP | H-10-190269 | 7/1998 |
| JP | 2002-163719 A | 6/2002 |
| JP | 2003-085640 A | 3/2003 |
| JP | 3132010 U9 | 5/2007 |
| KR | 10-2009-0045994 A | 5/2009 |
| WO | WO 99/31947 A1 | 6/1999 |
| WO | WO 2007/006580 A1 | 1/2007 |

OTHER PUBLICATIONS

Cambridge Filter (China) Co., Ltd., In the performance of the filter, pages printed from website, date last visited Jun. 29, 2010, 4 pages, http://translate.googleusercontent.com/translate, c?hl=en&sl=zh-CN&u=http://www.cambr . . . .

GORE, Cooling Filters, pages printed from website, date last visited Feb. 13, 2009, 2 pages, http://www.gore.com/en_xx/products/filtration/cooling/index.html.

GORE, Why use membrane cooling filters versus non-membrane filters?, page printed from website, date last visited Feb. 13, 2009, 1 page, http://www.gore.com/en_xx/products/filtration/cooling/cooling_versus.html.

GORE, Filtration Glossary, pages printed from website, date last visited Feb. 17, 2009, 2 pages, http://www.gore.com/en_xx/products/filtration/cooling/cooling_glossary.html.

GORE, Filtration Frequently Asked Questions, page printed from website, date last visited Feb. 17, 2009, 1 page, http://ww.gore.com/en_xx/products/filtration/cooling/cooling_faqs.html.

GORE, Cooling Filters increase reliability and lower costs, pages printed from website, date last visited Feb. 17, 2009, 2 pages, http://www.gore.com/en_xx/products/filtration/cooling/cooling_why_use2.html.

GORE, Applications Performance and Construction Materials, pages printed from website, date last visited Feb. 17, 2009, 1 page, http://www.gore.com/en_xx/products/filtration/cooling/cooling_applications_performance . . . .

GORE, Standards Compliance, pages printed from website, date last visited Feb. 17, 2009, 1 page, http://www.gore.com/en_xx/products/filtration/cooling/cooling_standards_compliance.html.

GORE, Cooling Filters, brochure, known prior to Jun. 11, 2010, 6 pages.

GORE, Cooling Filters, brochure, known prior to Jun. 11, 2010, 2 pages.

GORE, Cooling Filters, brochure, known prior to Jun. 11, 2010, 4 pages.

* cited by examiner

SELF SERVICE KIOSK INCORPORATING MOISTURE REPELLANT FILTER

CROSS-REFERENCE TO RELATED PATENT APPLICATIONS

This patent application claims the benefit of U.S. Provisional Patent Application No. 61/366,674, filed Jul. 22, 2010, the entire teachings and disclosure of which are incorporated herein by reference thereto.

FIELD OF THE INVENTION

The present invention generally relates to self-service kiosks and air venting systems of such self-service kiosks, and more particularly relates to the air filtration systems for such self-service kiosks.

BACKGROUND OF THE INVENTION

These days such self-service kiosks are quite commonplace and have been employed in a variety of industries for years. For example, there are a variety of self-service kiosks which allow a user such as a customer to input data and retrieve product such as other data and/or tangible products such as consumable items. Examples of self-service kiosks include: gas pumps, automated teller machines (ATMs) DVD rental kiosks, check-in kiosks at airports, gambling or other gaming devices, vending machines, and the like. Self-service kiosks include a user interface that is typically connected to at least one electrical component contained within the kiosk. For example, user interfaces may include a touch screen display, scanners, receipts, product dispensers and the like.

Often, some roof structure is provided over the kiosk such as an overhand of a building, a lobby entrance to a building, or an open roof structure (e.g. at a gas station for example). Considering that these kiosk stations are often located outside or proximate to the outside of buildings and in unsecure or less secure locations, it is self-evident that typically the electrical components as well as the housings for these units are relatively sturdy and secure enclosures to prevent easy access to the contents of such a machine. As such, the housings typically fully enclose the electrical component and typically the product inventory and the like.

Further, typically these kiosk stations do not employ hermetically sealed housings. Indeed, hermetically sealing such a unit would involve substantial expense. Instead, often times in the case of user interface components such as a product return bin, a coin or credit card insert slot, a receipt device or the like there are noticeable seepage areas through the housing through which air can seep into and out of the housing. It is believed that in many kiosk systems that the electronics may be substantially protected and/or sealed as best possible to protect the internal components within such a kiosk housing from the external elements. For example, kiosks may be located in situations where they are exposed to the weather either directly or indirectly. For example, even if the kiosk is located under a roof but outside of a building, it still may be subject to the effects of high humidity, fog, wind and the like.

Further, because such self-service kiosk stations typically employ electronics, and are subject to wide temperature swings depending upon the geographic location and season, it can be appreciated that the electronics contained within the housing may generate heat. Excessive heat can be undesirable and cause failure of such electronic components. Additionally, the contents contained within the kiosk such as a DVD or food product or the like may be temperature sensitive as well and be subject to premature failure or spoilage if conditions fall outside of a temperature range. This may also be true at the cold end for example in northerly geographic locations where temperatures get very cold and too cold outside a given temperature range (e.g. if a water or liquid component may be contained). As such, some kiosks may contain temperature control devices such as refrigeration systems and/or heating systems. Typically, such kiosks whether they have a temperature control system or not are often at least vented and sometimes with a fan unit to arranged to generate an air flow into the housing of the kiosk. Dust collection air filters have conventionally been provided in such vents where air flow is generated. Such air filter prevent dust from entering the housing and fouling components.

Notwithstanding, all of the environmental conditioning housing designs and electronic component shielding that is provided in such self-service kiosks, there is still premature failure or desire to maintain or expand the life span of such self-service kiosk as they are employed throughout the industry.

BRIEF SUMMARY OF THE INVENTION

The present invention is directed toward a self-service station such as a kiosk that comprises a housing with at least one electrical component contained in the housing. The user interface is connected to the at least one electrical component such as for use by customers. The housing includes a vent opening. An air filter is arranged to filter air entering the housing through the vent opening. The filter comprises a water repellent filter media which prevents the ingress of moisture and thereby should prolong the service life of the electrical components contained in the self-service station. Not only does the water repellant filter prevent or limit intrusion of moisture, but also other contaminants carried by the moisture such as salt, thereby reducing corrosion and lengthening lifespan.

Methods of maintaining existing kiosks contemplate replacing simple non-water repellant dust collection air filters with the water repellant air filters herein. Certain embodiments herein such as preferred fiber entanglement embodiments discussed herein also afford substantial dust loading and air flow capacity, such that open media air filters used previously can readily be switched out.

According to one aspect, the water repellent filter media also has a substantial dust collection functionality with preferably an ASHRAE dust holding capacity that is greater than 75 grams per square foot. Also preferably the water repellent filter media passes a salt fog test consistent with GR-487-core in accordance with ASTM B 117. Typically, the water repellent media will have a mean flow or diameter less than 10 microns. In most applications, the air filter will take the form of a panel filter having a rectangular frame with the water repellent filter media being pleated and sealingly mounted to the rectangular frame, being arranged therein. Typical dimensions for width and length may be between 4 and 30 inches and the pleat depth may range between about one-half inch and a few inches, depending upon the particular kiosk application.

A few select materials may be employed for the water repellent filter media used in embodiments herein. For example, one suitable filter media may be a membrane type filter media such as expanded PTFE and filter elements employing the same such as disclosed in Schwarz et al., U.S. Pub. 2009/0139405 entitled "Fan Cooling Unit for Cooling Electronic Components," or Kobayashi, U.S. Pat. No. 5,395,411 (the entire disclosures of Schwarz et al. and Kobayashi are hereby incorporated by reference in their entireties to the extent not inconsistent with the present disclosure). Alternatively, and more preferably, non-membrane filter medias may be employed such as the examples disclosed in Kobayashi, or more preferably the melt blown or fiber entanglement examples of U.S. application Ser. No. 12/813,603, filed Jun. 11, 2010 and assigned to the present assignee, the entire disclosure of which is hereby incorporated by reference in its entirety to the extent not inconsistent with the present disclosure. The more preferred examples such as shown in the assignee's co-pending '603 application provide for water repellent filter media that passes a salt fog test consistent with GR-487-core and in accordance with ASTM B 117 standard. It is believed that such a medias may be particularly advantageous where it is suspected that moisture, fog or wind blown rain may tend to communicate salt or other contaminants into kiosk housings and thereby shortening the life of the electronic components contained therein.

Advantageously, it is expected that the present invention will greatly expand the life of self-service kiosk stations such as gas pumps, ATMs, DVD kiosks, check-in kiosk stations at airports, gaming devices, vending machines and the like. In many of these kiosks, it will be appreciated that there may be seepage locations such that the housings are not water tight. For example, because of the user interfaces provided by these kiosks, there is particularly a user input provided for example, on a DVD kiosk returns of DVDs through a slot input is arranged. Further, there can be coin receptacles, credit card receivers, product dispensing (e.g. a dispensing output for a DVD or vending machine for example). Each of these provide for potential leak paths for air such that the housings are not considered water tight. Nevertheless, the effects of a water repellent element can yet be enjoyed by maintaining generally a positive pressure inside the housing relative to the outside so that when leaked air tends to leak through the filter it is from the inside to the outside of the housing. As a consequence, the air on the inside of the housing can be kept clean and substantially contaminant free.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
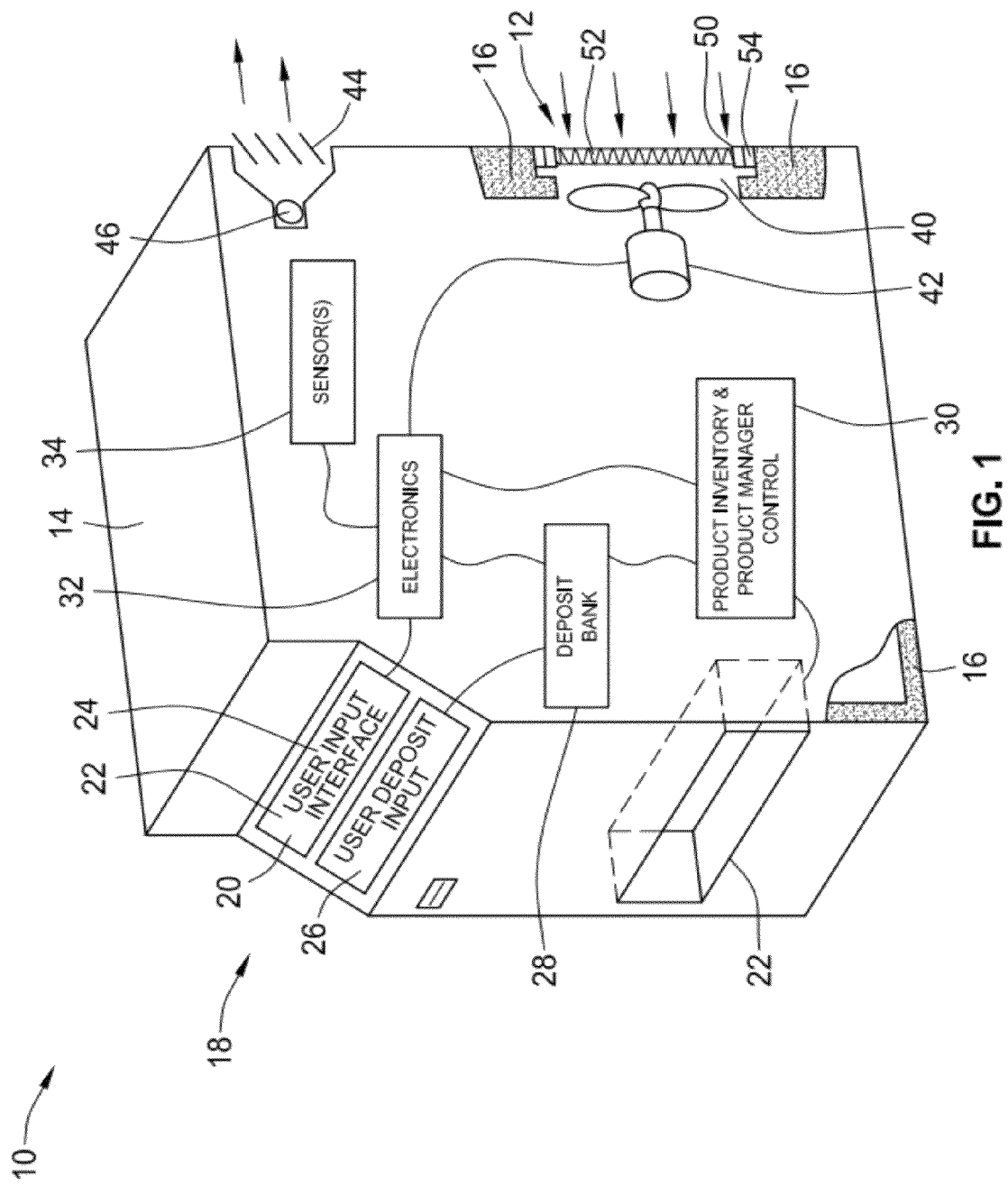
FIG. 1 is a schematic illustration of a self-service kiosk station according to the first embodiment which employs a vented air cooled housing.

Turning to FIG. 1, an embodiment of a self-service kiosk station 10 employing a water repellent filter 12 is illustrated schematically. It is understood that the self-service kiosk station 10 may be one of many forms such as a gas pump, an ATM machine, a DVD kiosk (e.g. the red box stations), a check-in station at an airport, a gaming device, a vending machine, or other similar type self-service station.

As illustrated, the station 10 includes an enclosure or housing 14 that may or may not include insulation 16 along its interior surface depending upon the application. As shown schematically various electrical components may be contained within the housing. A user interface generally indicated at 18 is provided so as to provide for interaction between a customer and the machine. For example, the user interface 18 typically includes at least one user input 20 and at least one user output 22, and often typically includes a display 24 that may also double as one of the user input interfaces (e.g. in the case of a touch screen display interface). For example, the user input may allow for data entry and include such things as a keyboard, selection buttons, a credit card swiper, a payment receptacle, a scanning device, or other appropriate inputs that allows a customer to transmit data into the machine.

Additionally, there may be one or more user deposits 26 that receive product or other material from a customer such as money or in the case of DVD rentals, returned DVDs for example. In some systems, returned DVDs and the like may be communicated back into product inventory via a product manager control 30. The user output may also take many forms and may simply be providing data back to the customer such as account balance or the like, or may also provide such things as receipts, or other tangible products such as in the case of a vending machine food or in the case of a DVD rental kiosk a rented DVD. Such tangible products may be stored and dispensed in the like from the product inventory and product manager control 30 schematically indicated in FIG. 1.

Electronics 32 in the housing can provide for the interaction with the overall user interface 18 as it is connected to the various user inputs and user outputs 20, 22 as schematically indicated in FIG. 1 as may be appropriate for a given application. The actual configuration of the user interfaces not of too much consequences relates to the present invention and as such recitations as to such kiosk arrangement components are meant to be construed broadly. However, it is noted that each of these different inputs and outputs also may provide the opportunity for potential leak path or seepage point between the outside of the housing and the inside of the housing. For example, coin slots or product dispenser locations may provide a ready path for air flow into and out of the housing. Typically, these housings 14 will not be sealed or at least not hermetically sealed.

The electronics 32 as is the case with any electrical components is often prone to generating heat which may be exacerbated in temperate climates or in the day when temperatures are elevated. As such, temperature sensors or other environmental sensors 34 may be employed so as to prevent overheating of the electronics and/or to direct operation of an environmental control to prevent an overheated condition within the kiosk station 10. For example, as shown in FIG. 1, an inlet vent 40 is provided through the housing 14, which may comprise simply a rectangular opening in the housing. Air flow through the inlet vent 40 can be generated by fan unit 42 which is preferably positioned proximate the inlet vent 40 to draw air through the inlet vent 40. As illustrated, the water repellent filter 12 is positioned in the inlet vent 40 so that air entering the housing 14 is filtered. Fan unit 42 may take various forms including a centrifugal blower, fan blades, or other air flow generating device. As shown, by being located proximate the inlet vent 40, the fan unit 42 is configured to pressurize the housing 14 so that there is an inside positive pressure. As a consequence, leakage or seepage of air through various gaps or openings in the housing to the extent it occurs is generally from the inside to the outside, (e.g. due to the fact that the fan unit when running generates positive pressure in the housing).

Additionally, and preferably, an outlet vent 44 may be provided (especially in the case of tighter or more sealed kiosk systems) with a check valve 46 optionally arranged therein to ensure that flow through the outlet vent is from the inside of the housing to the outside so as to exhaust the air within the housing. With this arrangement, air entering the housing 14 is filtered and substantially free of any moisture, salt or other contaminants by virtue of the water repellent filter 12. From there, this fresh filtered air flow may then be used to cool the electronics 32 with any heated air being then exhausted through the housing 14 either through seepage/leakage locations or through the outlet vent 14.

Figure 2:
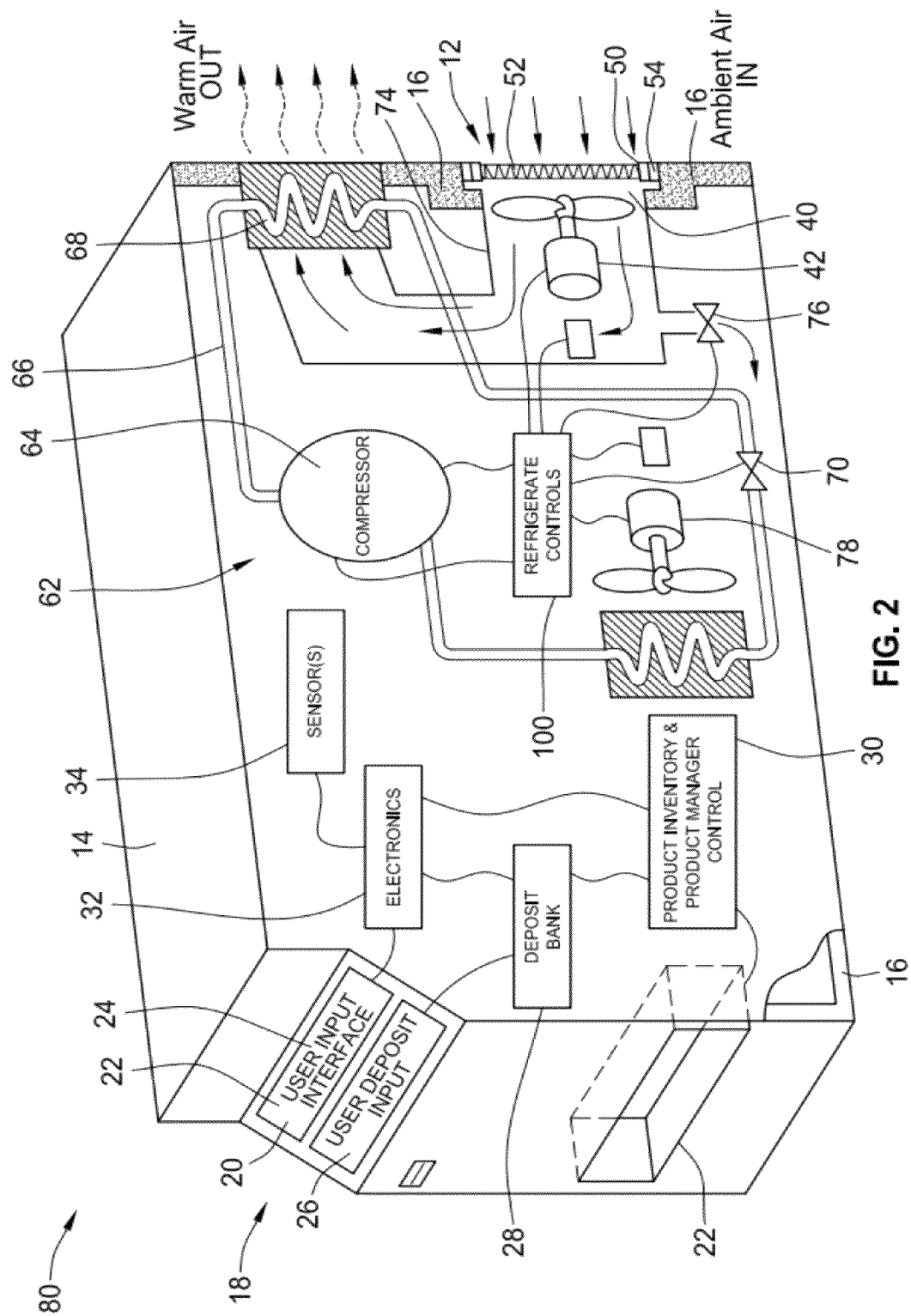
FIG. 2 is a schematic illustration of a second embodiment of a self-service kiosk station similar to FIG. 1 but employing a refrigeration system contained within the housing.
Figure 3:
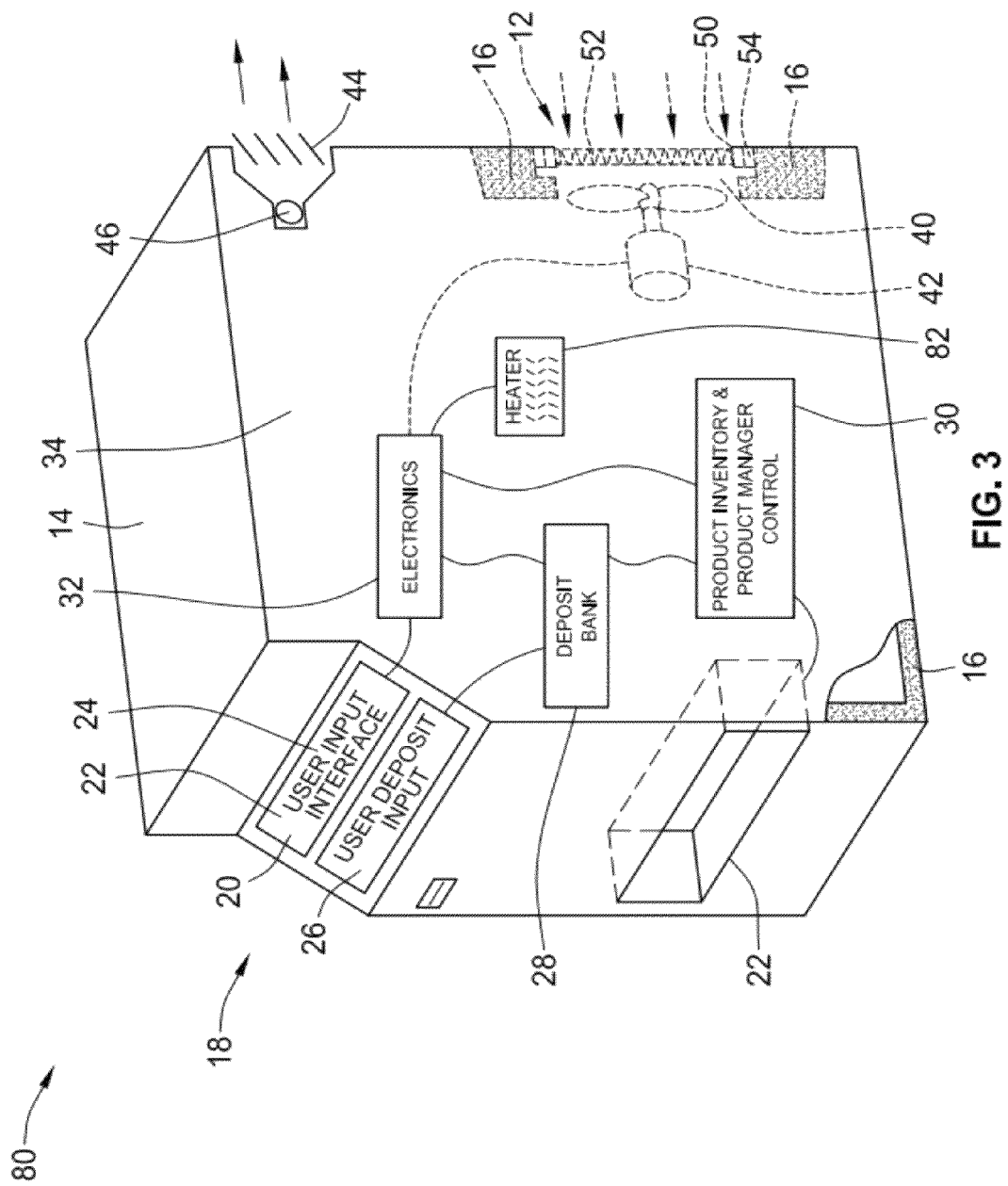
FIG. 3 is a schematic illustration of yet a further embodiment of a self-service kiosk station similar to that of FIG. 1 but also additionally employing a heating element.
Figure 4:
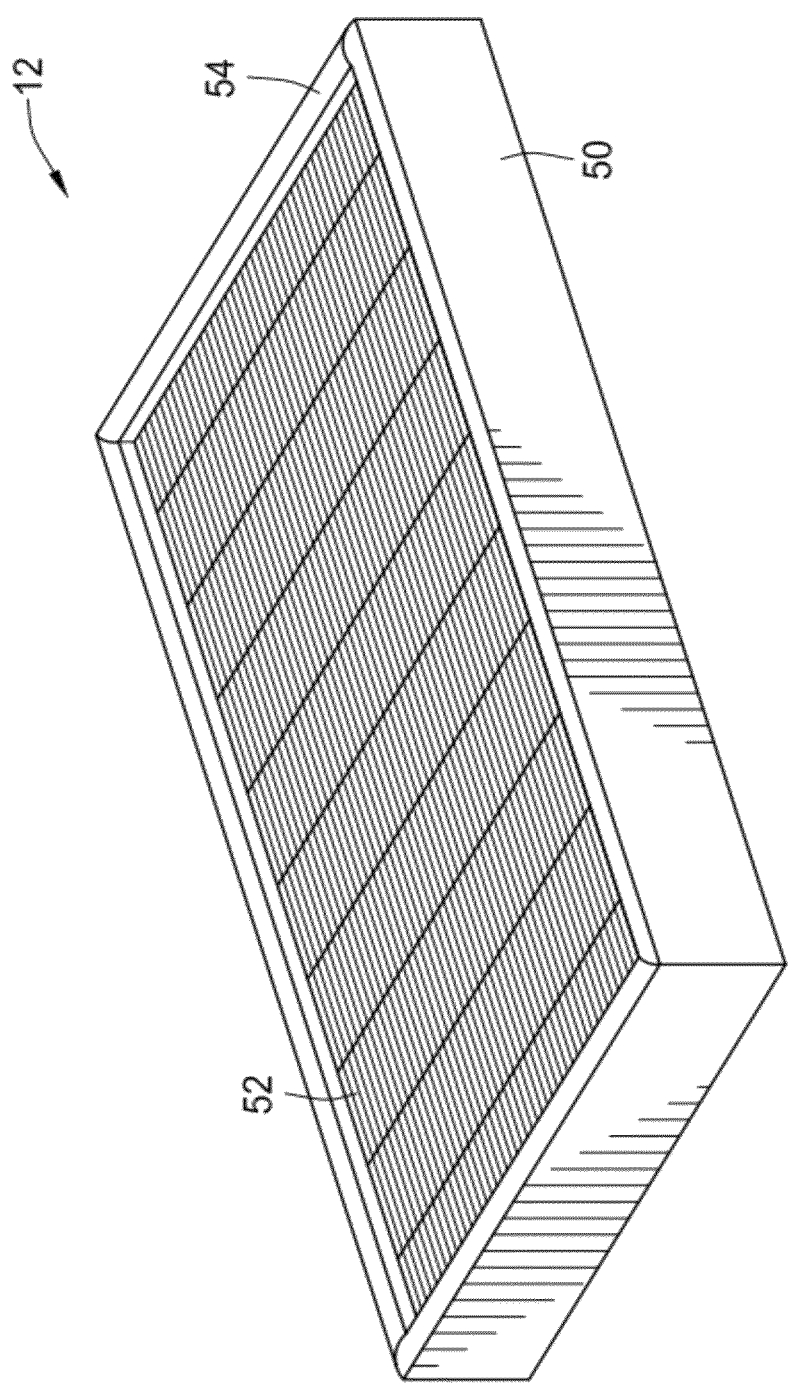
FIG. 4 is an isometric illustration of a rectangular filter element that may be employed in the embodiments of any of FIGS. 1-3.
Figure 5:
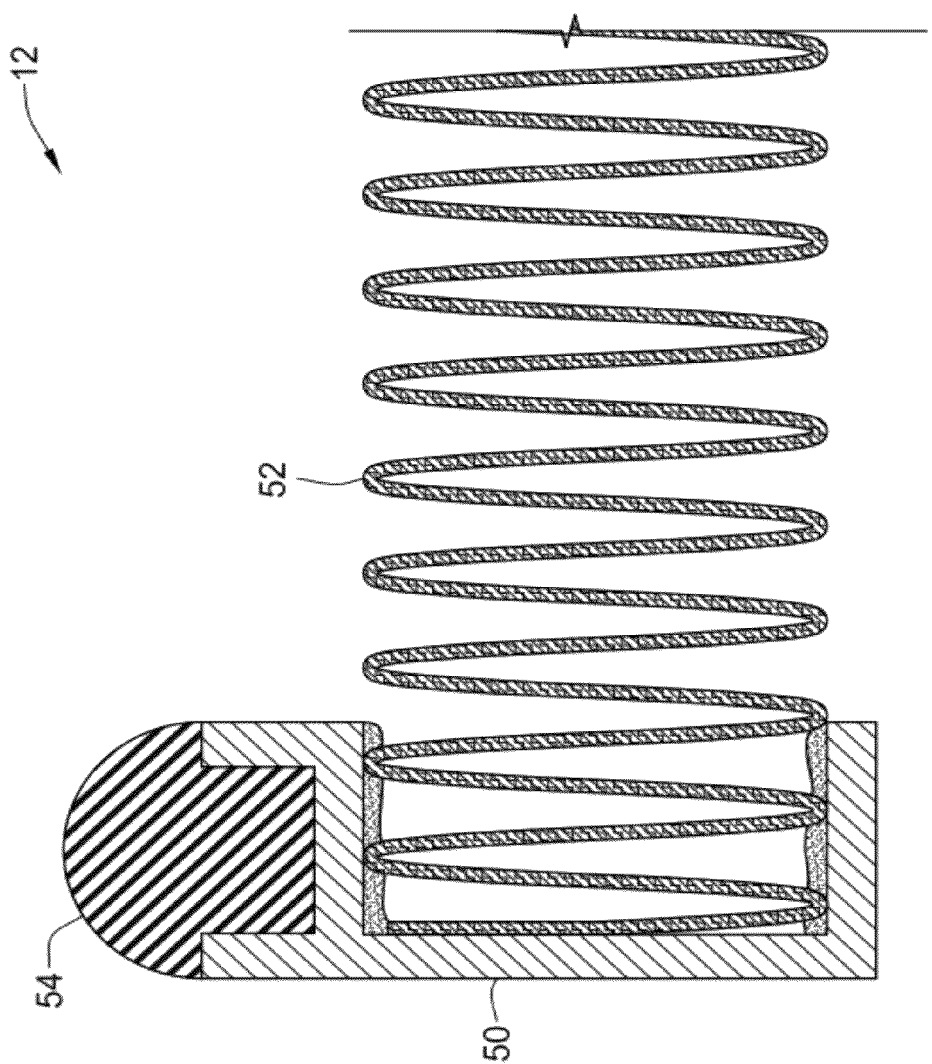
FIG. 5 is an enlarged cross sectional illustration of a portion of the filter elements shown in FIG. 4.

Before turning to other kiosk embodiments of FIGS. 2-3, and instead turning to FIGS. 4 and 5, an embodiment of a water repellent filter is illustrated. As shown therein, the air filter is in the form of a panel filter having a rectangular frame 50 with pleated water repellent filter media 52 contained within the frame 50 and spanning the interior thereof. The filter media 52 is sealingly mounted to the rectangular frame to avoid leak paths therebetween. The rectangular frame 50 may be in the form of a corrosion resistant member such as an aluminum frame or may take the form of a less expensive material such as a paperboard material (although not corrosion or water resistant—paperboard may be a much less expensive option); or alternatively an integrally molded frame member incorporating its own gasket as disclosed in the aforementioned application Ser. No. 12/813,603. In either event, the rectangular frame 50 preferably carries a sealed gasket along its rectangular periphery so as to provide a seal between the filter and the inlet vent 40 of the housing 14 when in use.

The water repellent filter media may take several forms but the media selection is important to garnering the advantages of reducing contaminants such as moisture or salt within the kiosk for the purpose of lengthening service life of the kiosk. A few select materials may be employed for the water repellent filter media used in embodiments herein.

For example, one suitable filter media may be a porous membrane type filter media such as porous expanded PTFE and filter elements employing the same such as disclosed in Schwarz et al., U.S. Pub. 2009/0139405 entitled "Fan Cooling Unit for Cooling Electronic Components," or Kobayashi, U.S. Pat. No. 5,395,411, both disclosures of which have been previously incorporated by reference.

Alternatively, and more preferably, non-membrane filter medias may be employed such as the example disclosed in Kobayashi, or more preferably the melt blown or fiber entanglement examples of U.S. application Ser. No. 12/813,603, filed Jun. 11, 2010 entitled "MEMBRANE-FREE FILTER AND/OR INTEGRAL FRAMING FOR FILTER." Examples such as shown in the assignee's co-pending '603 application provide for water repellent filter media that passes a salt fog test consistent with GR-487-core and in accordance with ASTM B 117 standard (membrane materials are also believed to satisfy that standard).

Figure 6:
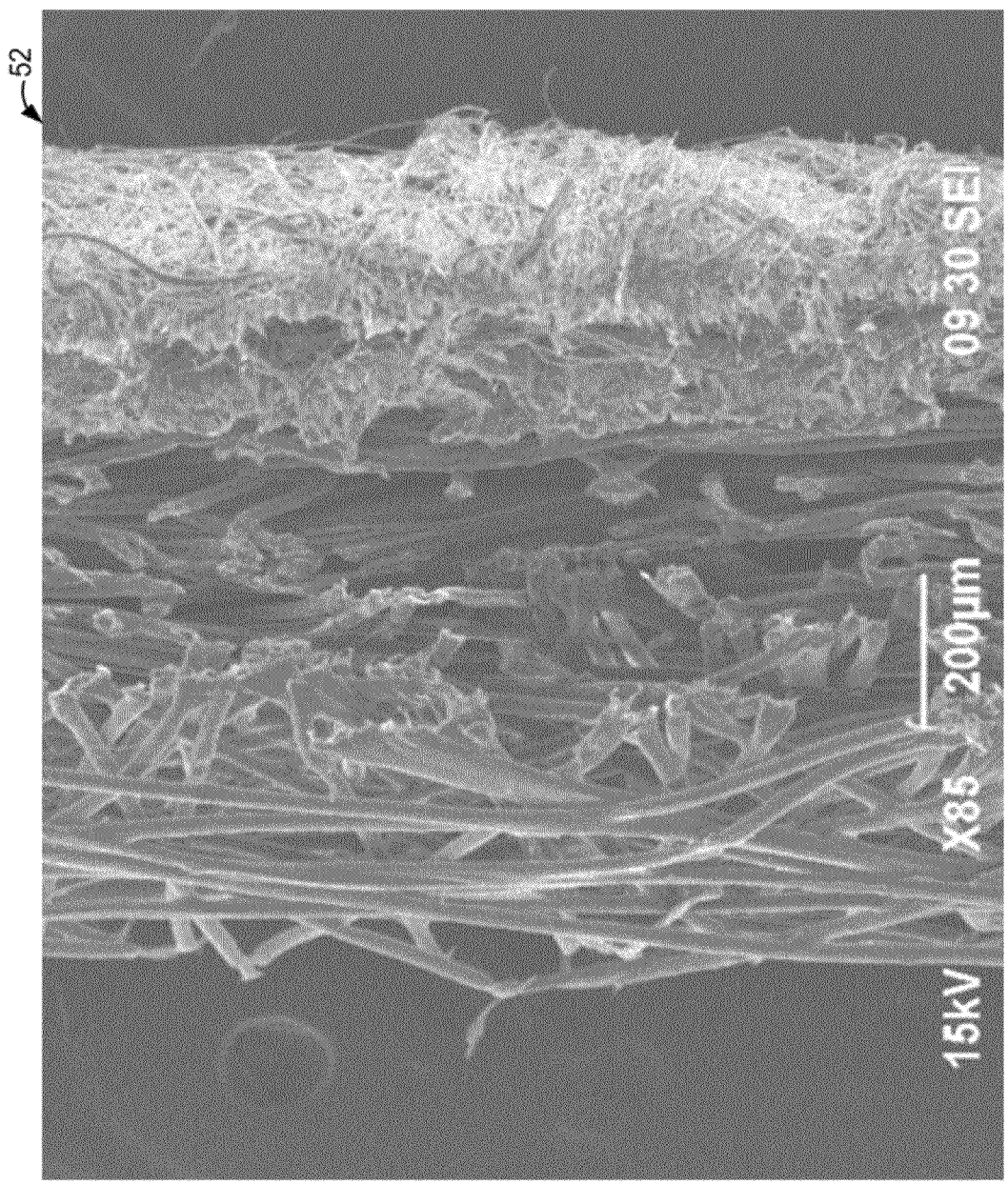
FIG. 6 is a photograph taken at times 85 magnification showing a cross-section of a composite filter media, used in the filter element of FIG. 4, that includes a depth-loading media and a substrate or carrier media according to an embodiment of the invention.
Figure 7:
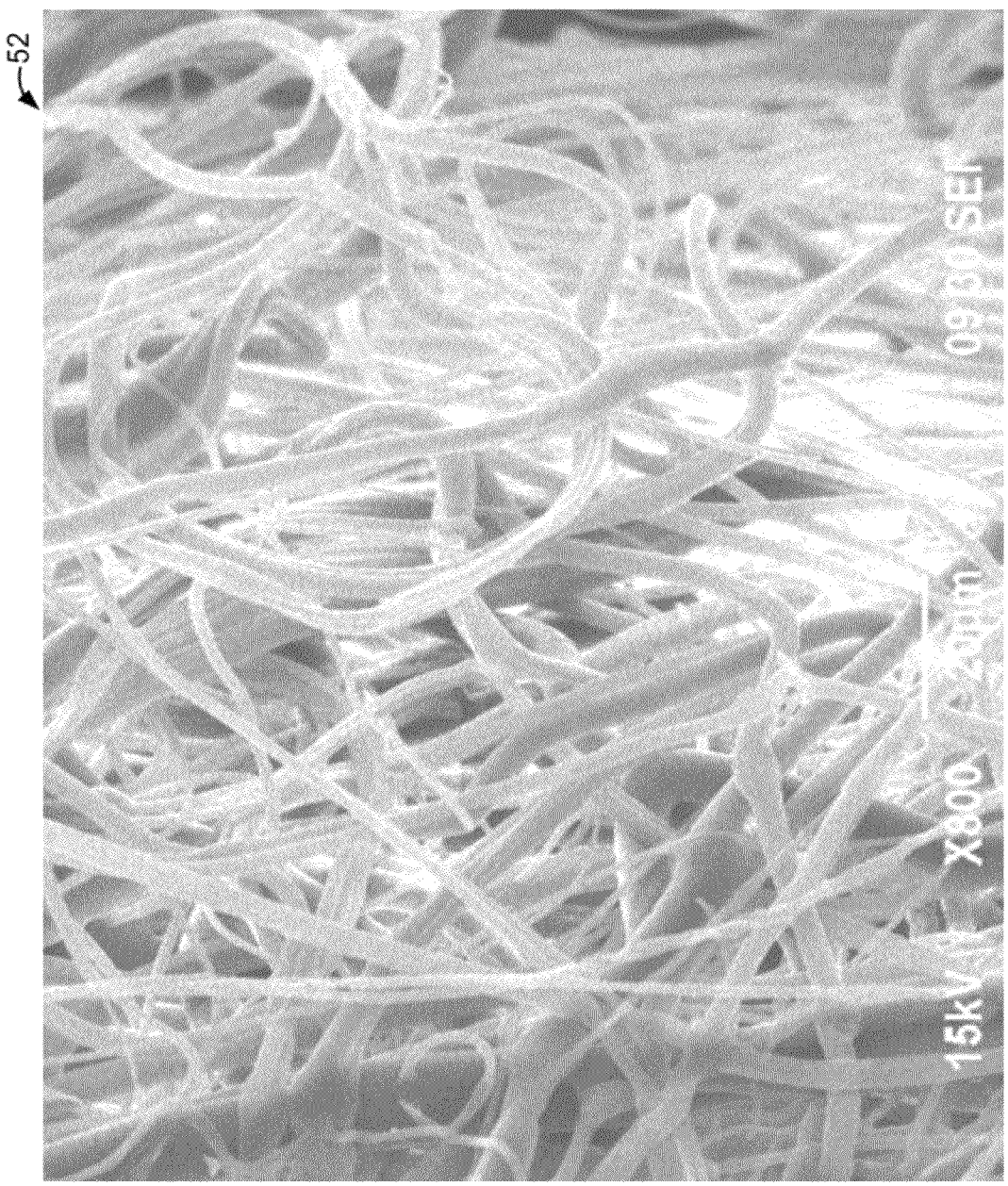
FIG. 7 is a photograph taken at times 800 magnification showing a cross-section of the depth-loading filter media that was illustrated in FIG. 6.

For example, FIGS. 6 and 7 illustrate SEM images illustrate such a water repellant filter media and a preferred filter media due to the fiber entanglement filtration benefits, which may be a composite media comprising multiple layers. It has also been found that either side of the media illustrated in FIGS. 6 and 7 may be employed as the upstream surface while still passing a salt fog test consistent with GR-487-core and in accordance with ASTM B 117 standard.

For the filter media illustrated in FIGS. 6 and 7, the selected substrate was made by Kimberly-Clark, under the trade designation Intrepid 684L HVAC Filtration Media, with the following reported properties and characteristics:

Polypropylene/Polyethylene
Basis weight: 3.10-3.40 oz./sq. yd.
Frazier air permeability: 318 cfm/ft.$^2$ (min. 303 cfm/ft.$^2$ roll avg.)
Target Efficiency: 48% (min. 42% roll avg.)—determined using TSI Model 8130 using 0.1 micron count median diameter NaCl particles at 85 lpm.
MD Gurley Stiffness: 325 mg (min. 265 mg roll avg.)

Further, as also seen in FIGS. 6 and 7, a tighter meltblown polypropylene material with two layers was made and laminated to what would become either the upstream or downstream surface of the substrate. This tighter meltblown layer was made by Transweb, LLC, located in Vineland, N.J. The composite filter media was made by Transweb, LLC, was designated by Transweb LLC with the trade designation T-Lam Grade AIRG-002 (Meltblown Polypropylene laminated to a high loft substrate) whose physical and filtration specifications are reported in the table below.

TABLE I

T-LAM AIRG-002 Physical and Filtration Specifications

| PARAMETER | UNITS | OBJ |
| --- | --- | --- |
| Basis Weight | gms/m2 | 160.0 |
| Thickness | millimeters | 1.35 |
| Air Permeability | cfm @ 0.5" H2O | 25.0 |
| Resistance 5 cm/sec DOP | mm/H$_2$O | 6.5 |
| Penetration 5 cm/sec DOP | percent | .015 |

Filtration testing performed on the TSI-8130
100 cm$^2$ Sample Holder (non pleated; flat sheet testing)
Challenge Aerosol DOP (Dispersed Oil Particulate at mean particle size of 0.3 micron)
Face Velocity 5 cm/sec To get such fiber entanglements to work that often have a more random and more open structure throughout the depth, the capillary action and/or surface tension of water was realized as an important feature to preventing moisture from flowing through such fiber entanglements. Capillary action is the tendency of a liquid to rise in narrow tubes or be drawn into small pores as may be created through a fiber structure of the filter media. Sponges or paper towels work through capillary action for example. The mutual attractive force that exists between like water molecules is known as cohesion and is responsible for holding droplet of water together. Cohesion is closely related and produces "surface tension" which may allow objects that are more dense than water to be supported on the water surface without sinking. When attractive forces of water with an unlike material exists, that is often referred to as adhesion. There thus is also an interplay between the types of fibers selected as well as the size of the pores in the media. Sufficiently small pores preventingress of water due to capillary action (e.g. a sufficiently small tube will trap and/or suck water into the tube and overcome the gravitational effects of water).

Melt blown medias for example have considerable depth for example with a varied pore structure developed throughout the depth. Further, to facilitate reasonable air flow, the media should be sufficiently open to facilitate enough cooling. Yet further, fiber entanglements including for example a plurality of different virtually infinite length fibers are subject to deformation, stretching and the like that can alter pore size and/or the filtration performance.

Various filtration characteristics are noted to be germane to preventing ingress of moisture and satisfying rigorous standards, particularly the salt fog test, while at the same time facilitating air flow so as to not be overly restrictive, and at the same time providing sufficient dust loading capacity, and in fact, what is believed to be much greater capacity throughout the depth of the media, as compared to that of membranes that are characterized as surface loading medias and thus may tend to clog quickly on the surface of the media.

With the foregoing, various guidelines and parameters have been contemplated for a suitable media, not all of which are necessarily required, but are noted and contemplated as useful in developing a media that can use surface tension and the capillary effect to withstand the effects of a continuous salt fog spray mist exposure while fans are operating with the housing drawing air through the filter media, and thereby prevent moisture breaking through the filter and into the housing. As such, embodiments of the present invention may include one or more of the features and parameters discussed below, preferably the more the better.

One preferred structural feature of certain embodiments is the provision of a separate carrier or substrate layer to provide for the pleatability and support strength functions (and optional additional dust depth loading function if located along the upstream side); in combination with a very high efficiency depth-loading media layer(s) that provide for moisture penetration resistance due to capillary action as well as small dust particle collection via depth loading. The carrier substrate layer may be either on the upstream or downstream side of the high efficiency depth loading media layer(s).

In viewing the SEM image of an exemplary filter media shown in FIG. 6-7, a couple of observations can be made about selections of medias for various embodiments, which is discussed the following paragraphs, understanding that this embodiment of the media falls within these preferred ranges. First, the average fiber thickness of individual fibers is much greater in the carrier substrate support layer than in the one or more deposition layers. For example, the average fiber thickness of individual fibers in the substrate layer may be between 5 micron and 50 micron, and more preferably between 10 and 35 micron. It is also seen that little variability in fiber thickness may be provided in the substrate support layer (less than 2.5 times variation and typically less than one times of fiber thickness variation difference between largest and smallest fibers (excepting out statistical aberrations—measured by 97.5% of the fibers). The substrate or carrier support layer with substantially thicker fibers can therefore provide structural support to withstand air flow forces and support the finer fibers of the efficiency layer(s) against the effects of the same such as when subject to air flow conditions in various geographic locations that may experience salt fog conditions. This may be due to the fact in part that the fibers of the carrier support layer are on average between 4 and 20 times as thick as those of the efficiency layer(s).

In contrast, the efficiency layer(s) may include a smaller average diameter of between 0.5 micron (500 nanometers) and 5 micron, and a great range of variability in fiber size with some fibers closer to about 5 micron for example and some closer to about 1 micron, and even sub-micron fibers with fibers having thickness measured in nanometers. Thus, the variability in fiber thickness may be at least 300%, greater than 500%, and perhaps up to 1000% (excepting out statistical aberrations—e.g. measured by 97.5% of the fibers). Fiber variation is believed to have an advantage in that smaller fibers or brittle type material fibers could be more subject to deformation, breakage and the like that could change pore size over time. By selecting media with intermingled different sized fibers within the efficiency layer, it is theorized that smaller fibers can provide the benefit of reducing pore size and creating capillary action without unduly creating restriction within the depth of the media; and larger fibers can provide internal support. To maintain fiber strength and prevent deformation or movement of fibers within the fiber entanglement, it may be desirable to heat set, thermally bond, solvent bond and/or adhesively bond the individual fibers together at the contact points between the fibers, and thus are contemplated as embodiments. Additional processing or steps included in a melt blown or fiber entanglement laying process may thus be desired.

In terms of fiber materials, various polymeric materials can be selected, and preferably providing such fibers with an electrostatic charge to enhance capture efficiency may be desirable. Typically non-absorbent fibers will be desired to avoid deformation of fibers. Synthetic fibers including, but not limited to, polypropylene, polyester, nylon, polyethylene, bi-component fibers and the like are contemplated, as well as possibly glass fibers or other synthetic fibers for either the carrier substrate layer and/or the efficiency layer(s).

The materials for the carrier substrate layer preferably may be heat set or otherwise embossable to provide for pleating functionality. For example, U.S. Pat. Nos. 6,885,833, 5,290,447, and 5,804,014, and German patent DE 19755466 A1, show a suitable carrier substrate layer and technology for embossing and pleating, the entire disclosures of which are hereby incorporated by reference. This when combined with the efficiency layer(s) and selecting an efficiency layer that can maintain performance after pleating is preferred so that the efficiency layer(s) can be first deposited upon and laminated to the carrier layer first, and then a subsequent pleating operation can be employed. It is noted for example that some stretching or compression at the pleat tips can occur during pleating in the efficiency layer(s).

As also can be observed in the SEM image at FIGS. 6 and 7, the substrate support layer, with a substantial open pore structure to provide substantial air permeability by itself. For example, the air permeability in the substrate support layer by itself is typically greater than 318 cfm/square foot; and preferably greater than 300 cfm/square foot, measured by a Frazier air permeabilty test at 0.5" water gauge. The substrate media test sample was one square meter. The restriction or limiting factor on air flow is the depth-loading efficiency layer(s), such that the composite has an overall air permeability of at least 10 cfm per square foot, and preferably between 15 and 40 cfm per square foot, measured by a Frazier air permeabilty test at 0.5" water gauge. The efficiency layer test sample was 100 square centimeters. Thus, substantial air flow can be obtained thus on comparative or at least sufficient levels with non-water repellant media used in kiosks of the prior art.

A great degree of particle capture efficiency is desired for smaller particles. It has been found that filter media with greater than a MERV 14 rating is desired, although MERV 14 medias may suffice as well. Preferably, at least a MERV 16 rating, and even better, is desired. Thus, the efficiency layer is quite tight enough to provide for moisture filtration through capillary action and surface tension effects throughout the depth of the efficiency layer(s).

In terms of pore related pressure characteristics, some desirable characteristics have been contemplated. Preferably, the media has a mean flow pore pressure greater than 0.6 psi and a mean flow pore diameter less than 10 microns; and even more preferably, a mean flow pore pressure greater than 0.8 psi and a mean flow pore diameter less than 8 micron. A bubble point pressure of greater than 0.3 psi is also desirable.

Also, some desirable efficiency and pore size characteristics are contemplated. For example, an efficiency of the composite filter media is greater than about 90 percent for particles from 0.30 to 0.40 microns in diameter. Further, a very tight pore size distribution is provided for air flow. For example, the pore size distribution of the composite filter media (which is controlled by the efficiency layer(s) is such that preferably more than 50 percent of the pores are from 4 to 8 microns in diameter; preferably a pore size average diameter of between 5 micron and 7 micron; and preferably less than 20 percent of the pores are larger than 10.5 microns in diameter. Yet according to a further measurement, a cumulative filter flow of 90 percent through the composite filter may be achieved at an average pore diameter between 4 and 6 microns to provide for sufficient air flow, yet less than 20 percent of cumulative filter flow through pores having a diameter of greater than 20 microns. Further, preferably, the smallest pore size in the composite filter media is less than four microns in diameter, greater than 5% of the pore sizes being less than 5 micron.

The melt blown polymeric fiber entanglement (e.g. the two efficiency layers combined) preferably has a thickness of at least about 0.25 millimeter and typically less than about 1 millimeter and preferably between 0.3 millimeter and 0.5 millimeter; and the composite filter media (substrate and efficiency layers combined) include a thickness of at least about 1 millimeter, and preferably a thickness of between 1 and 3 millimeters. The media may have an air permeability (cfm @ 0.5" $H_2O$) of between 15 and 40; a basis weight of between 100 and 200 grams/$m^2$. When the efficiency layers are upstream, there is at least 0.25 millimeters of depth filtration available particularly for the smaller particles as. Such depth also can be seen with reference to FIG. 6, which is a cross-section through the composite media to show the various layers.

This provides a substantial dust holding capacity of with an average synthetic dust weight arrestance greater than 96 percent, and wherein an ASHRAE dust holding capacity of the composite filter is greater than 0.75 grams per square foot. A further increase and gradient depth filtration can be achieved by reversing the media wherein larger dust particles would tend to load into the substrate carrier layer (which is upstream) with smaller dust particles depth loading in the tighter efficiency layer.

Other types of medias are contemplated as well which can provide for pore structures that prevent salt fog mist penetration due to capillary action and/or surface tension including the use of nanofibers (fine fibers formed from electrospinning with average diameter (e.g. thickness) less than one micron and typically less than 500 nanometers, and in some embodiments less than 100 nanometers) either on the surface of a substrate layer or integrated into a media layer. For example, it is contemplated that one way to improve the efficiency, reduce pore size (without necessarily increasing restriction) and capabilities of filter media includes the use of extremely fine fibers, or nanofibers, such as disclosed in application Ser. No. 12/271,322, entitled Filtration medias, Fine Fibers Under 100 nanometers and methods; application Ser. No. 12/428,232, entitled Integrated Nanofiber media; application Ser. No. 12/357,499 entitled Filter Having Meltblown and Electrospun fibers, the entire disclosures of which are hereby incorporated by reference. Such embodiments and broader claimed aspects relate to contemplated use of such nanofibers to provide for tiny pores for mist filtration. These fine fibers may be made from a variety of different polymers.

While the tightness of the media is one aspect and the use nanofibers can certainly provide a selected pore size parameter range discussed herein, it is contemplated that mere addition of fine fibers such as nano-fibers (or other such tight fiber structure to provide for small pores) would preferably be further supplemented with a suitable electrostatic charge treatment, such as employed on certain examples discussed herein. The selection of a media with such an electro-static charge treatment is believed to be a contributing factor to the prevention of water ingress. This is also known as Such an electrostatic charge treatment should increase surface tension to better prevent water or salt fog ingress. Examples of an electrostatic charge treatment include corona exposure, ion bombardment, and flourine containing plasma, and are sometimes referred to as an "electret" type filter media. Electret is a dielectric material that has a quasi-permanent electrical charge or dipole polarization (equivalent of a permanent magnet). Electret generates internal and external electrical fields and thereby interacts with potential contaminants—in this case water, which is also a bipolar material. As such, it is theorized that the electrical effects are such as to preventingress of water through small pores of an electret filter material, if the pore structure is sufficiently tight. Accordingly, when fine fibers such as nanofibers or other such fibers (e.g. fine melt blown) are utilized, preferably an electrostatic charge treatment is employed to generate additionally an electret material. While some electrostatic charge treatments such as corona discharge may be useful, preferably a more permanent treatment may be employed, such as for example the use of flourine-containing plasma as disclosed in U.S. Pat. No. 6,419,871 to Ogale, entitled "Plasma Treatment Of Filter Media", the entire disclosure of the which is hereby incorporated by reference in its entirety, including other referenced patents and the like therein which are also incorporated by reference in their entireties to the extent not inconsistent with the present disclosure.

Alternative Kiosk Embodiments

Turning then to FIG. 2, an embodiment of a self-service kiosk station 60 similar to the embodiment of FIG. 1 but additionally with its own refrigeration system 62 is illustrated. Because similar components and the like are illustrated it is understood that the discussion and description for FIG. 1 is equally applicable to FIGS. 2 and 3 with like reference numbers being used across these different schematic illustrations for purposes of consistency and to avoid duplicative discussion. However, additional features with references to FIGS. 2 and 3 will be discussed herein.

As shown in FIG. 2, the refrigeration system 62 may be employed to cool one or both of the electronics 32 and depending upon the contents product contained within the product inventory and product inventory control 30. In this embodiment, the refrigeration system includes a compressor 64 to compress refrigerant through a refrigeration circuit 66 and loop. From the compressor, the compressed refrigerant is first transferred into a condenser 68 which in essence is a heat exchanger so that the heat generated can be released through the heat exchanger. Thereafter, refrigerant is then looped to metering or expansion valve 70 and then through an evaporator 72 where the refrigerant is allowed to expand and therefore absorb heat (generating a refrigeration effect) and then back to the compressor 64. To ensure that the heat generated at the condenser 68 is not retained within the housing, a dedicated air duct 74 may be provided along with the fan unit 42 (which in this embodiment also operates as the "condenser fan") so that air can be run through the condenser and then exhausted back to the external environment picking up the heat absorbed at the condenser. A bypass 76 may also be employed along the duct 74 (or a separate fan unit employed) so that a portion of the filtered air flow entering the duct 74 and through the water repellent filter 72 may be allowed to enter into the internal part of the housing so that fresh air and/or positive pressure may be maintained within the self-service kiosk station. As also illustrated a second fan unit 78 in the form of an evaporator blower is illustrated so as to circulate air across the evaporator and convey the chilled air to the appropriate locations in the kiosk station whether it is to cool the electronics 32 and/or to cool or chill product contained within the product inventory and product inventory control 30.

Still further in FIG. 3 is a further embodiment employing a heater which may be used in conjunction with either of embodiments 1 or 2. For example, in some northerly locations, or applications where there is sensitive product or other material which is frost or otherwise cool temperature sensitive, it may be desired to employ a heater 82 in the self-service kiosk station 80 so as to maintain temperature within the housing above a lower limit. A fan unit may or may not be employed in such instances as air may simply be allowed to vent through the water repellent filter 12 at the inlet vent 40. Again, however similar advantages are gained by using the water repellent filter which prevents the occurrence of moisture, and contaminants such as salt that may be carried by moisture otherwise through the vent if the water repellent filter 12 was not employed.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A self service station, comprising:
   a housing;
   at least one electrical component contained in the housing;
   a user interface connected to the at least one electrical component;
   a vent opening in the housing;
   a single filter element in series arranged to filter air entering the housing through the vent opening, the filter element comprising a water repellant filter media, and wherein the filter element is a composite element free of a membrane layer.

2. The self service station of claim 1, wherein the water repellant filter media passes a salt fog test consistent with GR-487-CORE and in accordance with ASTM B 117.

3. The self service station of claim 2, wherein the water repellant filter media has a mean flow pore diameter less than 10 microns.

4. The self service station of claim 1, wherein the water repellant filter media has an ASHRAE dust holding capacity that is greater than 0.75 grams per square foot.

5. The self service station of claim 1, wherein the single filter element in series is in the form of a panel filter having a rectangular frame with the water repellant filter media being pleated and being sealingly mounted to the rectangular frame and arranged within the rectangular frame, the frame having width dimensions between about 4 inches and about 30 inches, and length dimensions between about 4 inches and about 30 inches, the filter media have a pleat depth of at least about ½ inch.

6. The self service station of claim 1, wherein the filter media has a bubble point pressure greater than 0.3 psi. has a mean flow pore pressure greater than 0.6 psi, and wherein the filter media is selected to have at least a MERV 16 rating.

7. The self service station of claim 1, wherein the water repellant filter media includes a fiber entanglement including melt blown polymeric fibers having a thickness of at least about ¼ millimeter, and wherein, wherein the fiber entanglement is laminated to a substrate such that the water repellant filter media is a composite filter media that includes at least 6 of the 8 following characteristics:
   (1) a thickness of between 1 and 3 millimeters;
   (2) an air permeability (cfm @ 0.5" $H_2O$) of between 15 and 40;
   (3) a basis weight of between 100 and 200 grams/$m^2$;
   (4) a pore size distribution such that more than 50 percent of the pores are from 5 to 8 microns in diameter and wherein a pore size distribution of the composite filter media is such that less than 20 percent of the pores are larger than 10.5 microns in diameter;
(5) an efficiency greater than about 90 percent for particles from 0.30 to 0.40 microns in diameter;
(6) an average synthetic dust weight arrestance greater than 96 percent, and wherein an ASHRAE dust holding capacity of the composite filter is greater than 0.75 grams per square foot;
(7) a cumulative filter flow of 90 percent through the composite filter is achieved at an average pore diameter between 4 and 6 microns; and
(8) wherein the smallest pore size in the composite filter media is less than four microns in diameter, greater than 5% of the pore sizes being less than 5 micron.

8. The self service station of claim 1, wherein the filter media includes a carrier substrate layer and an efficiency fiber entanglement laminated thereto, the efficiency fiber entanglement including hydrophobic fibers providing the composite media with greater than a MERV 14 rating, the filter media being electrostatically charged to form an electret.

9. The self service station of claim 1, wherein the user interface includes electronics in communication with a display and at least one user input for at least one of user data entry and product selection; and at least one user output in the form of at least one of output data and a product dispenser.

10. The self service station of claim 9, wherein the at least one user input further includes in combination a user input deposit for receiving material into the housing.

11. The self service station of claim 9, wherein the at least one user input and the at least one user output provide for leak flow openings into the housing such that the housing is not hermetic; further comprising a fan arranged to convey air into the housing through the singlefther element in series that when operated maintains a positive pressure inside the housing relative to outside so that air flow through leak flow openings is generally inside to the outside of the housing.

12. The self service station of claim 9, further comprising a refrigeration system including in an operable circuit a compressor, a condenser having a heat exchanger an evaporator generating a cool air flow, comprising a condenser fan arranged to convey a filtered air flow through the single filter element in series and through the heat exchanger and external of the housing.

13. The self service station of claim 12, wherein a portion of the filtered air flow is directed into the housing into communication with the user input and output to maintains a positive pressure inside the housing relative to outside so that air flow through any leak flow openings is generally inside to the outside of the housing.

14. The self service station of claim 12, further comprising an evaporator fan arranged to circulate air through the evaporator to generate a cool air flow to cool the electronics.

15. The self service station of claim 12, further comprising a heater contained in the housing for temperature control, wherein air flow is vented through the single filter element in series.

16. A method of maintaining a self service station, comprising:
arranging a single filter element in series to filter air entering a vent opening in the self service station, the filter element comprising a water repellant filter media; and
generating an air flow through the filter element into the self service station.

17. The method of claim 16, further comprising:
replacing a non-water repellant air filter element with said single filter element in series having the water repellant filter media.

18. A self service station, comprising:
a housing;
at least one electrical component contained in the housing;
a user interface connected to the at least one electrical component;
a vent opening in the housing;
a filter element arranged to filter air entering the housing through the vent opening, the filter element comprising a water repellant filter media, wherein the filter media is a composite media free of a membrane layer.

19. The self service station of claim 18, wherein the filter media includes a carrier substrate layer and an efficiency fiber entanglement laminated thereto, the efficiency fiber entanglement including hydrophobic fibers providing the composite media with greater than a MERV 14 rating, the filter media being electrostatically charged to form an electret.

\* \* \* \* \*